(12) United States Patent
Kobayashi (10) Patent No.: US 10,294,849 B2
(45) Date of Patent: May 21, 2019

(54) COOLING DEVICE HAVING A REFRIGERANT SUPPLY PART OF A CONDENSER ARRANGED HIGHER THAN A SHAFT PART OF A TURBINE IN A GRAVITY DIRECTION

(71) Applicant: TOYOTA JIDOSHA KABUSHIKI KAISHA, Toyota-shi, Aichi-ken (JP)

(72) Inventor: Hideo Kobayashi, Mishima (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 175 days.

(21) Appl. No.: 15/329,275

(22) PCT Filed: Jul. 14, 2015

(86) PCT No.: PCT/JP2015/070195
§ 371 (c)(1),
(2) Date: Jan. 26, 2017

(87) PCT Pub. No.: WO2016/021379
PCT Pub. Date: Feb. 11, 2016

(65) Prior Publication Data
US 2017/0226918 A1 Aug. 10, 2017

(30) Foreign Application Priority Data
Aug. 5, 2014 (JP) .................. 2014-159201

(51) Int. Cl.
*F01K 9/00* (2006.01)
*F01P 3/22* (2006.01)
(Continued)

(52) U.S. Cl.
CPC ............ *F01P 3/2271* (2013.01); *F01D 15/10* (2013.01); *F01D 25/12* (2013.01); *F01D 25/16* (2013.01);
(Continued)

(58) Field of Classification Search
CPC ......... F01D 25/12–25/22; Y02T 10/166; F01P 3/22–3/2285;
(Continued)

(56) References Cited

U.S. PATENT DOCUMENTS 2,961,550 A * 11/1960 Dittman .................. F01D 25/22
184/6.26
3,393,515 A * 7/1968 Tabor ...................... F01D 25/22
184/6
(Continued)

FOREIGN PATENT DOCUMENTS

JP 54053730 A * 4/1979
JP 60-219419 A 11/1985
(Continued)

*Primary Examiner* — Laert Dounis
(74) *Attorney, Agent, or Firm* — Sughrue Mion, PLLC (57) ABSTRACT

A cooling device for an internal combustion engine including: an ebullient cooling system in which a refrigerant cools the internal combustion engine by boiling in the internal combustion engine, and a rankine cycle system including a superheater that superheats the refrigerant discharged from the internal combustion engine, a turbine to which the refrigerant discharged from the superheat is supplied, and a condenser that condenses the refrigerant discharged from the turbine; wherein the rankine cycle system includes a supply path that supplies a liquid-phase refrigerant discharged from the condenser to a shaft part of the turbine, and a first supply part of the condenser to which the refrigerant discharged from the turbine is supplied is arranged higher than the shaft part of the turbine in a gravity direction.

5 Claims, 4 Drawing Sheets

(51) Int. Cl.
  *F01D 25/12* (2006.01)
  *F01D 25/16* (2006.01)
  *F01D 25/22* (2006.01)
  *F01K 23/06* (2006.01)
  *F02G 5/04* (2006.01)
  *F01D 15/10* (2006.01)

(52) U.S. Cl.
  CPC .............. *F01D 25/22* (2013.01); *F01K 9/003* (2013.01); *F01K 23/06* (2013.01); *F01K 23/065* (2013.01); *F02G 5/04* (2013.01); *F01D 25/125* (2013.01); *Y02T 10/166* (2013.01)

(58) Field of Classification Search
  CPC ..... F01P 2003/2214–2003/2292; F01K 23/06; F01K 23/065; F01K 23/10–23/108
  USPC .......................................................... 60/657
  See application file for complete search history.

(56) References Cited

U.S. PATENT DOCUMENTS

| | | | | |
|---|---|---|---|---|
| 4,005,580 A | * | 2/1977 | Swearingen | F01D 11/04 184/6 |
| 4,044,561 A | * | 8/1977 | Hohn | F01D 25/166 277/432 |
| 4,362,020 A | * | 12/1982 | Meacher | F01D 25/22 290/52 |
| 4,363,216 A | * | 12/1982 | Bronicki | F01D 25/22 184/6.22 |
| 4,471,621 A | * | 9/1984 | Amir | F01D 25/32 60/657 |
| 4,608,827 A | | 9/1986 | Hasegawa et al. | |
| 2004/0055303 A1 | * | 3/2004 | Sugarmen | F01K 3/247 60/670 |
| 2009/0188253 A1 | | 7/2009 | Smith et al. | |
| 2011/0047958 A1 | | 3/2011 | Yamashita et al. | |
| 2012/0003082 A1 | | 1/2012 | Niwa et al. | |
| 2012/0312009 A1 | | 12/2012 | Smith et al. | |
| 2013/0008165 A1 | * | 1/2013 | Yamada | F01K 9/00 60/671 |
| 2015/0048618 A1 | * | 2/2015 | Inomata | F01D 15/10 290/52 |

FOREIGN PATENT DOCUMENTS

| | | | |
|---|---|---|---|
| JP | 2008-542629 A | | 11/2008 |
| JP | 2010-223116 A | | 10/2010 |
| JP | 2012-012989 A | | 1/2012 |
| JP | 2012-097612 A | | 5/2012 |
| JP | 2012102644 A | * | 5/2012 |
| JP | 2014-092042 A | | 5/2014 |
| WO | 2011/024375 A1 | | 3/2011 |

* cited by examiner

COOLING DEVICE HAVING A REFRIGERANT SUPPLY PART OF A CONDENSER ARRANGED HIGHER THAN A SHAFT PART OF A TURBINE IN A GRAVITY DIRECTION

CROSS REFERENCE TO RELATED APPLICATIONS

This application is a National Stage of International Application No. PCT/JP2015/070195 filed Jul. 14, 2015, claiming priority based on Japanese Patent Application No. 2014-159201 filed Aug. 5, 2014, the contents of all of which are incorporated herein by reference in their entirety.

TECHNICAL FIELD

The present invention is related to a cooling device for an internal combustion engine.

BACKGROUND ART

Patent Document 1 discloses a cooling device including an ebullient cooling system in which a refrigerant cools the internal combustion engine by boiling in an internal combustion engine, and a rankine cycle system in which the refrigerant discharged from the internal combustion engine is supplied, as a conventional cooling device for the internal combustion engine. Moreover, the rankine cycle system according to Patent Document 1 includes a superheater that superheats the refrigerant discharged from the internal combustion engine, a turbine to which a refrigerant (superheated steam) discharged from the superheater is supplied, and a condenser (referred to as "condenser" in Patent Document 1) that condenses a refrigerant discharged from the turbine.

PRIOR ART DOCUMENT

Patent Document

[Patent Document 1] Japanese Unexamined Patent Application Publication No. 2010-223116

SUMMARY OF THE INVENTION

Problems to be Solved by the Invention

Although the superheated steam is not explicitly disclosed in Patent Document 1, the superheated steam discharged from the superheater in the rankine cycle system is supplied to the turbine, more specifically, a blade of the turbine. In this case, the heat of the high temperature superheated steam is transmitted to the blade, so that the blade might become the high temperature. When the blade of the turbine becomes the high temperature, the heat of the blade is transmitted to a shaft part of the turbine, so that the shaft part of the turbine also might become the high temperature. When the shaft part of the turbine becomes the high temperature, a bearing pivotally supporting the shaft part of the turbine might be damaged by the heat. For this reason, a technique to cool the shaft part of the turbine is demanded. However, when a refrigerant pump supplies the refrigerant to the shaft part of the turbine and cools the shaft part of the turbine, for example, a cost of the cooling device increases.

The present invention has an object to provide a cooling device for an internal combustion engine that can suppress an increase in a cost and cool a shaft part of a turbine.

Means for Solving the Problems

A cooling device for an internal combustion engine according to the present invention includes: an ebullient cooling system in which a refrigerant cools the internal combustion engine by boiling in the internal combustion engine, and a rankine cycle system including a superheater that superheats the refrigerant discharged from the internal combustion engine, a turbine to which the refrigerant discharged from the superheat is supplied, and a condenser that condenses the refrigerant discharged from the turbine; wherein the rankine cycle system includes a supply path that supplies a liquid-phase refrigerant discharged from the condenser to a shaft part of the turbine, and a first supply part of the condenser to which the refrigerant discharged from the turbine is supplied is arranged higher than the shaft part of the turbine in a gravity direction.

According to the cooling device for the internal combustion engine, the refrigerant changed to the liquid phase can be supplied to the shaft part of the turbine through the supply path due to a gravity. Thereby, it is possible to cool the shaft part of the turbine. Moreover, the liquid-phase refrigerant discharged from the condenser need not be supplied to the shaft part of the turbine by a refrigerant pump, and hence the increase in cost can be suppressed.

In the above configuration, the shaft part of the turbine may be pivotally supported by a bearing into which grease is sealed. According to the configuration, it is possible to lubricate the bearing by the sealed grease. Thereby, it is possible to suppress the seizure of the bearing. Moreover, the increase in cost can be suppressed in comparison with a case where the lubrication oil of the internal combustion engine is supplied to the shaft part of the turbine and hence the seizure of the bearing is suppressed. In the above configuration, the cooling device may include a path that supplies a refrigerant changed from a liquid phase to a gas phase in the shaft part of the turbine to the refrigerant supply part. Moreover, in the above configuration, the condenser may include a first condenser that condenses a refrigerant to be supplied to internal combustion engine, a second condenser that condenses a refrigerant to be supplied to the shaft part of the turbine, and an inlet tank that is common to the first condenser and the second condenser, the cooling device may include a first path that supplies a refrigerant after having been supplied to a blade of the turbine to the inlet tank, a second path that supplies to the inlet tank a refrigerant changed from a liquid phase to a gas phase in the shaft part of the blade, and the second condenser may be arranged nearer to a part of the inlet tank connected to the first path and the second path than the first condenser.

Effects of the Invention

According to the present invention, it is possible to provide a cooling device for an internal combustion engine that can suppress the increase in the cost and cool the shaft part of the turbine.

MODES FOR CARRYING OUT THE INVENTION

A description will be given of an embodiment of the present invention.

Embodiment

Figure 1:
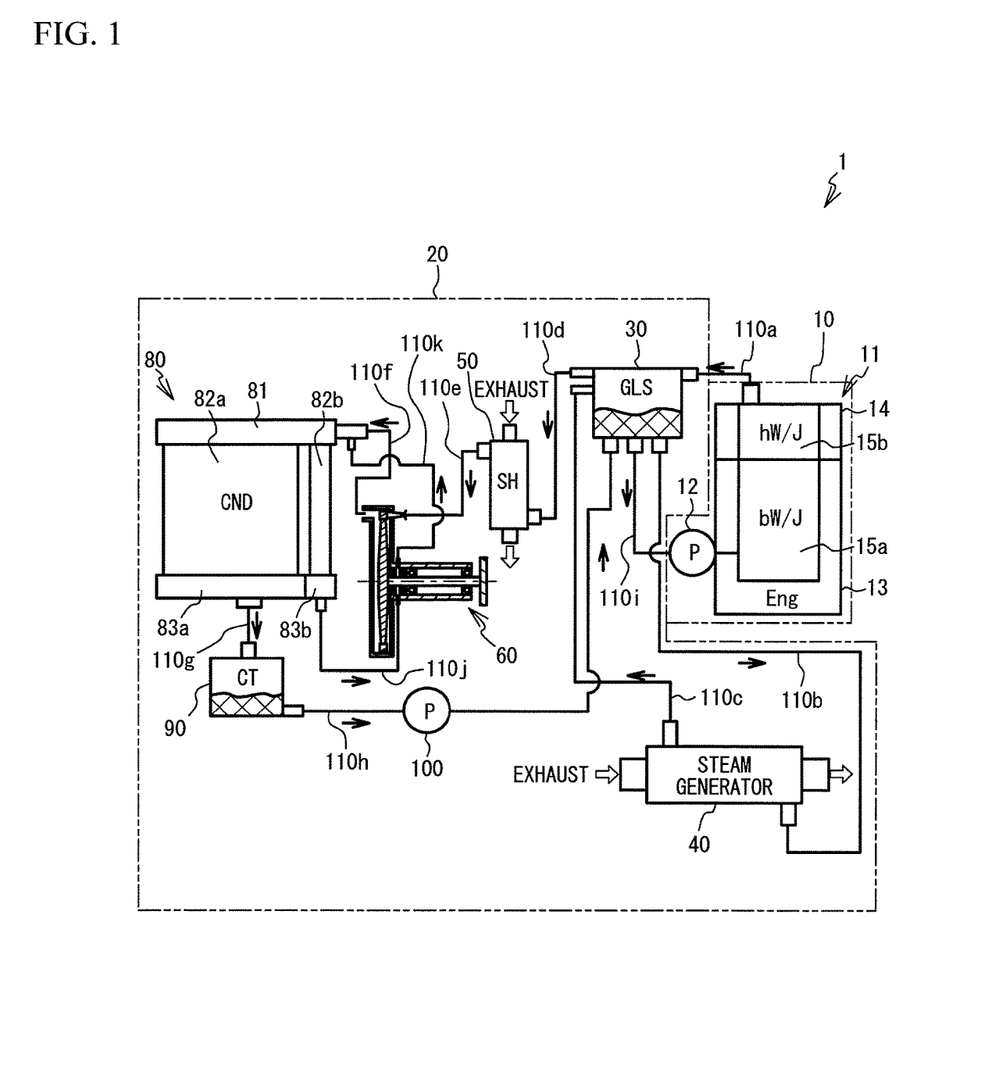
FIG. 1 is a schematic view illustrating the entire configuration of a cooling device for an internal combustion engine.

A description will be given of a cooling device 1 of an internal combustion engine 11 according to an embodiment of the present invention. FIG. 1 is a schematic view illustrating the entire configuration of the cooling device 1. The cooling device 1 is mounted on a vehicle. The cooling device 1 includes an ebullient cooling system 10 and a rankine cycle system 20. The ebullient cooling system 10 is a system in which a refrigerant cools the internal combustion engine 11 by boiling in the internal combustion engine 11. The ebullient cooling system 10 includes: a pump 12; a water jacket 15a formed inside a cylinder block 13 of the internal combustion engine 11; and a water jacket 15b formed inside a cylinder head 14 of the internal combustion engine 11. The pump 12 forcibly feeds a refrigerant toward the internal combustion engine 11. The concrete configuration of the pump 12 is not limited in particular. Various kinds of water pumps, such as a mechanical water pump driven by a power of the crankshaft of the internal combustion engine 11 or an electric water pump driven by a motor, can be used. In the present embodiment, the mechanical water pump is used as an example of the pump 12.

A liquid-phase refrigerant forcibly fed from the pump 12 circulates through the water jacket 15a and the water jacket 15b of the internal combustion engine 11 in this order, and is discharged from the internal combustion engine 11. When the refrigerant circulates through the water jacket 15a and the water jacket 15b, the refrigerant receives the heat of the internal combustion engine 11 to boil. At the time of the boiling, the refrigerant absorbs the heat of the internal combustion engine 11 as latent heat. The ebullient cooling system 10 cools the internal combustion engine 11 effectively in this way.

Here, a concrete kind of the refrigerant is not limited in particular, but, in the present embodiment, the refrigerant containing ethylene glycol and water is used as an example of the refrigerant. Specifically, in the present embodiment, LLC (long life coolant) is used as the refrigerant. Since the refrigerant contains ethylene glycol other than water, a freezing point of the refrigerant is reduced and the freeze of the refrigerant can be suppressed in comparison with a case where the refrigerant consists of only water.

The rankine cycle system 20 includes a gas liquid separator 30, a steam generator 40, a superheater 50, a turbine 60, a condenser 80, a catch tank 90, a pump 100, and various paths (paths 110a to 110k) through which the refrigerant passes.

Figure 2:
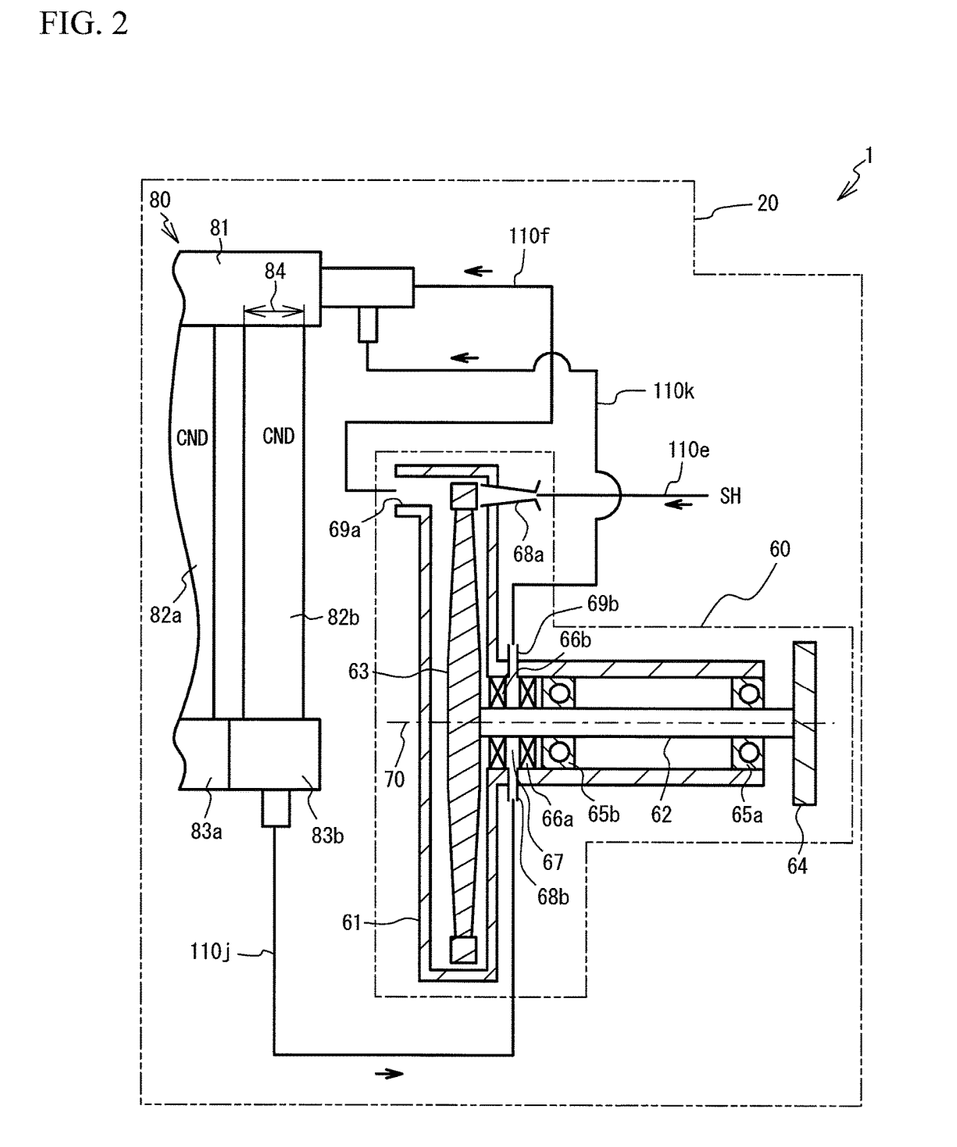
FIG. 2 is an enlarged schematic view in the vicinity of a turbine of the cooling device.

The path 110a allows a refrigerant discharge part of the internal combustion engine 11 and a refrigerant supply part of the gas liquid separator 30 to communicate with each other, as illustrated in FIG. 1. A path 110b allows a refrigerant discharge part of the gas liquid separator 30 and a refrigerant supply part of the steam generator 40 to communicate with each other. A path 110c allows a refrigerant discharge part of the steam generator 40 and a refrigerant supply part of the gas liquid separator 30 to communicate with each other. A path 110d allows a refrigerant discharge part of the gas liquid separator 30 and a refrigerant supply part of the superheater 50 to communicate with each other. FIG. 2 is an enlarged schematic view in the vicinity of the turbine 60 of the cooling device 1. With reference to FIG. 2, a path 110e allows a refrigerant discharge part of the superheater 50 and a refrigerant supply part 68a of the turbine 60 to communicate with each other. A path 110f allows a refrigerant discharge part 69a of the turbine 60 and an inlet tank 81 of the condenser 80 to communicate with each other. With reference to FIG. 1, a path 110g allows an outlet tank 83a of the condenser 80 and a refrigerant supply part of the catch tank 90 to communicate with each other. A path 110h allows a refrigerant discharge part of the catch tank 90 and a refrigerant supply part of the gas liquid separator 30 to communicate with each other. Here, the pump 100 is arranged on the path 110h. A path 110i allows a refrigerant discharge part of the gas liquid separator 30 and a refrigerant supply part of the pump 12 to communicate with each other. With reference to FIG. 2, a path 110j allows an outlet tank 83b of the condenser 80 and a refrigerant supply part 68b of the turbine 60 to communicate with each other. The path 110k allows a refrigerant discharge part 69b of the turbine 60 and the inlet tank 81 of the condenser 80 to communicate with each other.

The refrigerant (gas-phase) discharged from the water jacket 15b of the internal combustion engine 11 is supplied to the gas liquid separator 30 through the path 110a. The gas liquid separator 30 is a device that separates the supplied refrigerant into a gas-phase refrigerant and a liquid-phase refrigerant. A part of the liquid-phase refrigerant stored in the gas liquid separator 30 is supplied to the steam generator 40 through the path 110b.

The steam generator 40 is a device that heats the supplied refrigerant by waste heat of the internal combustion engine 11 to generate steam. In the present embodiment, the heat of an exhaust in an exhaust path of the internal combustion engine 11 is used as an example of the waste heat of the internal combustion engine 11. Specifically, the steam generator 40 is arranged on a part of the downstream side than the superheater 50 in an exhaust flow direction in an exhaust path of the internal combustion engine 11. The steam generator 40 heats the supplied refrigerant by heat of the exhaust passing through the exhaust path to generate the steam. The refrigerant (gas-phase) discharged from the steam generator 40 is supplied to the gas liquid separator 30 through the path 110c.

The gas-phase refrigerant which exists in the gas liquid separator 30 is supplied to the superheater 50 through the path 110d. The superheater 50 is a device that superheats the refrigerant by the waste heat of the internal combustion engine 11 to generate the superheated steam. In the present embodiment, the heat of the exhaust in the exhaust path of the internal combustion engine 11 is used as an example of the waste heat of the internal combustion engine 11. Specifically, the superheater 50 is arranged on a part of the upstream side than the steam generator 40 in the exhaust path of the internal combustion engine 11, and superheats the refrigerant by the heat of the exhaust passing through the exhaust path to generate the superheated steam. The refrigerant (superheated steam) discharged from the superheater 50 is supplied to the turbine 60 through the path 110e. Here, the details of the turbine 60 are mentioned later. The refrigerant (gas-phase) discharged from the turbine 60 is supplied to the inlet tank 81 of the condenser 80 through the path 110f.

The condenser 80 is a device that condenses the supplied gas-phase refrigerant to generate the liquid-phase refrigerant. The condenser 80 according to the present embodiment is a so-called condenser. The condenser 80 includes the inlet tank 81, a condensation part 82a, a condensation part 82b, the outlet tank 83a and the outlet tank 83b. The inlet tank 81 is a refrigerant inlet tank that is common to the condensation part 82a and the condensation part 82b. The outlet tank 83a is a refrigerant outlet tank for the condensation part 82a. The outlet tank 83b is a refrigerant outlet tank for the condensation part 82b. The condensation part 82a and the condensation part 82b condense the gas-phase refrigerant flowed from the inlet tank 81 to generate the liquid-phase refrigerant. Each of the condensation part 82a and the condensation part 82b according to the present embodiment includes a plurality of thin tubes each having a plurality of fins. The gas-phase refrigerant flowed from the inlet tank 81 to the thin tubes of each of the condensation part 82a and the condensation part 82b performs heat exchange with outside air when the gas-phase refrigerant passes through the thin tubes. Thereby, the refrigerant condenses and becomes the liquid-phase refrigerant. The liquid-phase refrigerant condensed in the condensation part 82a flows into the outlet tank 83a, and the liquid-phase refrigerant condensed in the condensation part 82b flows into the outlet tank 83b. Here, the outlet tank 83a and the outlet tank 83b are not communicated with each other. Therefore, it is suppressed that the refrigerant in the outlet tank 83b flows into the outlet tank 83a and the refrigerant in the outlet tank 83a flows into the outlet tank 83b.

In the present embodiment, the condensation part 82b is arranged near a part of the inlet tank 81 coupled with the path 110f and the path 110k, compared with the condensation part 82a. Therefore, the refrigerant supplied to the inlet tank 81 through the path 110f and the path 110k preferentially flows into the condensation part 82b.

The liquid-phase refrigerant in the outlet tank 83a is supplied to the catch tank 90 through the path 110g. The catch tank 90 is a tank that temporarily stores the refrigerant discharged from the outlet tank 83a of the condenser 80. When the pump 100 operates, the refrigerant in the catch tank 90 is forcibly fed to the path 110h and supplied to the gas liquid separator 30. That is, the pump 100 has a function as a refrigerant pump that forcibly feeds the refrigerant condensed by the condenser 80 (specifically, the refrigerant stored in the catch tank 90 in the present embodiment) to the gas liquid separator 30. A concrete kind of the pump 100 is not limited in particular, but, in the present embodiment, an electric displacement type water pump, in particular, an electric displacement type vane pump is used as an example. Here, the pump 100 operates by receiving an instruction from a controlling device (not shown). A part of the liquid-phase refrigerant stored in the gas liquid separator 30 is supplied to the pump 12 through the path 110i, and is forcibly fed to the water jacket 15a of the internal combustion engine 11.

Next, a description will be given of the details of the turbine 60. With reference to FIG. 2, the turbine 60 includes a casing 61, a shaft part 62, a blade 63 coupled with one end (a left end in FIG. 2) of the shaft part 62, an output part 64 coupled with another end (a right end in FIG. 2) of the shaft part 62, bearings 65a and 65b, and seal parts 66a and 66b. Here, an axis 70 illustrated in FIG. 2 is a line indicating a rotation center of the shaft part 62. The casing 61 is a case that accommodates the blade 63, the shaft part 62, the bearings 65a and 65b, and the seal parts 66a and 66b.

The refrigerant supply part 68a, the refrigerant discharge part 69a, the refrigerant supply part 68b and the refrigerant discharge part 69b mentioned above are provided on the casing 61. In the present embodiment, the refrigerant supply part 68a is a supersonic nozzle. Thereby, the superheated steam supplied to the refrigerant supply part 68a through the path 110e raises a speed thereof effectively by passing through the supersonic nozzle, and is supplied to the blade 63. Then, the position of the refrigerant supply part 68a is adjusted so that the superheated steam supplied from the refrigerant supply part 68a collides in an outer peripheral part of the blade 63.

The blade 63 rotates by receiving a power from the superheated steam supplied from the refrigerant supply part 68a. By the rotation of the blade 63, the shaft part 62 coupled with the blade 63 also rotates around the axis 70. By the rotation of the shaft part 62, the output part 64 coupled with the shaft part 62 also rotates. The output part 64 is a part for extracting the output of the turbine 60. In the present embodiment, a pulley is used as an example of the output part 64. A generator is connected to the pulley through a belt. By the rotation of the pulley, the generator generates an electrical power. In this way, the rankine cycle system 20 according to the present embodiment collects the waste heat (heat of the exhaust) of the internal combustion engine 11 as the electrical power. Here, as long as the output of turbine 60 can be extracted, the concrete configuration of the output part 64 is not limited to the pulley, and may be a gear, a sprocket or the like, for example.

The refrigerant after having been supplied to the blade 63 of the turbine 60 is discharged from refrigerant discharge part 69a, and is supplied to the inlet tank 81 of the condenser 80 through the path 110f. Here, the refrigerant as the superheated steam expands by being supplied to the blade 63 of the turbine 60. That is, the turbine 60 according to the present embodiment corresponds to a member having a function as an expander of the rankine cycle system 20.

The bearings 65a and 65b are members pivotally supporting the shaft part 62. The bearings 65b is arranged nearer to the blade 63 than the bearing 65a in a direction along the axis 70 (hereinafter referred to as "an axial direction"). As long as the shaft part 62 can be pivotally supported, the concrete configuration of the bearings 65a and 65b is not limited in particular. In the present embodiment, a ball bearing (i.e., grease sealing ball bearing) in which a grease is sealed is used. Each of the bearings 65a and 65b includes: balls as rolling elements; a holder that holds the balls; the grease; and a sealing mechanism for sealing the grease inside the bearing 65a or 65b. The grease is sealed inside the bearings 65a and 65b so as to lubricate the balls. Thereby, the seizure of the bearings 65a and 65b is suppressed.

In the present embodiment, a cooling part 67 that is a space where the liquid-phase refrigerant is supplied is provided on a domain surrounded by the seal part 66a, the seal part 66b and the shaft part 62. The liquid-phase refrigerant discharged from the outlet tank 83b of the condenser 80 flows from the refrigerant supply part 68b into the cooling part 67 through the path 110j. That is, the path 110j according to the present embodiment has a function as a supply path that supplies the liquid-phase refrigerant discharged from the condensation part 82b of the condenser 80 to the shaft part 62 of the turbine 60 (specifically, the cooling part 67 provided around the shaft part 62). Here, the cooling part 67 is arranged nearer to the blade 63 than the bearings 65a and 65b in the axial direction. The seal parts 66a and 66b seal the refrigerant of the cooling part 67. Moreover, the seal parts 66a and 66b suppress that an air which intrudes into parts where the bearings 65a and 65b of the casing 61 are accommodated intrudes into a part where the blade 63 of the casing 61 is accommodated.

Here, in the present embodiment, a refrigerant supply part 84 of the condensation part 82b to which the refrigerant is supplied is arranged higher than the shaft part 62 in a gravity direction. More specifically, the refrigerant supply part 84 according to the present embodiment is arranged higher than the axis line 70 of the shaft part 62 in the gravity direction. Here, in the present embodiment, the refrigerant supply part 84 is a hole provided on the top of the condensation part 82b. The refrigerant in the inlet tank 81 is supplied to the condensation part 82b through the refrigerant supply part 84. Thus, since the refrigerant supply part 84 is arranged higher than the shaft part 62, when a liquid level of the refrigerant changed to a liquid phase in the condensation part 82b of the condenser 80 reaches a position higher than the shaft part 62 in the gravity direction, the refrigerant can be supplied to the shaft part 62 of the turbine 60 through the path 110j due to the gravity. Therefore, in the present embodiment, a refrigerant pump is not arranged on the path 110j.

Here, as a vertical distance (a vertical distance in the gravity direction) between the refrigerant supply part 84 and the shaft part 62 of the turbine 60 is made longer, the refrigerant in the condensation part 82b can be easily supplied to the shaft part 62 due to the gravity. On the other hand, when the height of the refrigerant supply part 84 from a ground is made high to lengthen the vertical distance between the refrigerant supply part 84 and the shaft part 62, the height of the vehicle (the height of a part in which a radiator of the vehicle is accommodated) rises. When the height of the shaft part 62 of the turbine 60 from the ground is lowered too much, the turbine 60 might contact the ground while the vehicle is traveling. Therefore, with respect to how much the vertical distance between the refrigerant supply part 84 and the shaft part 62 of the turbine 60 is set, an appropriate value needs to be set in consideration of a limitation of the height of the vehicle, data about how much the distance between the turbine 60 and the ground needs to be secured, or the like.

The refrigerant flowed into the cooling part 67 of the turbine 60 cools the shaft part 62. Specifically, the cooling part 67 performs low pressure boiling on the refrigerant flowed into the cooling part 67. Thereby, the refrigerant cools the shaft part 62 not only by sensible heat but also by using latent heat of vaporization.

The refrigerant after having cooled the shaft part 62 is discharged from the refrigerant discharge part 69b and is supplied to the inlet tank 81 of the condenser 80 through the path 110k. Here, the refrigerant discharge part 69b according to the present embodiment is arranged higher than the refrigerant supply part 68b in the gravity direction. Specifically, the refrigerant discharge part 69b according to the present embodiment is provided on a part of the casing 61 corresponding to a top (an uppermost part) of the cooling part 67. Moreover, the refrigerant supply part 68b according to the present embodiment is provided on a part of the casing 61 corresponding to a bottom (a lowest part) of the cooling part 67. Thus, the refrigerant discharge part 69b is arranged higher than the refrigerant supply part 68b in the gravity direction, and hence the refrigerant which becomes the steam by boiling in the cooling part 67 can be easily discharged from the refrigerant discharge part 69b.

Figure 3:
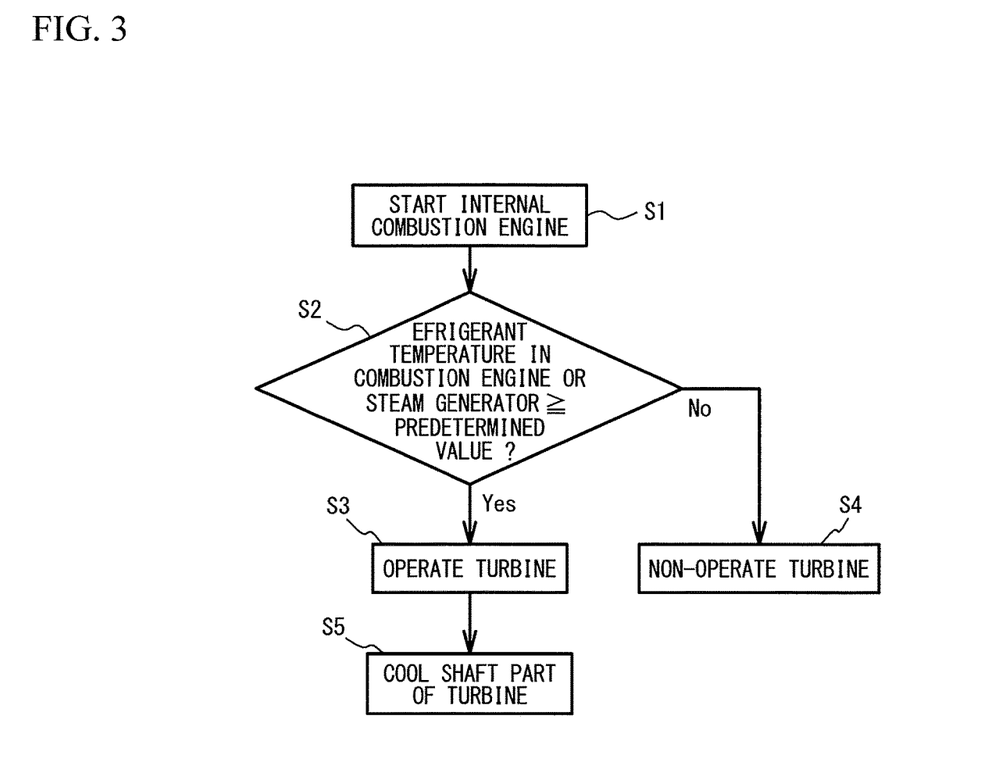
FIG. 3 is a flowchart illustrating an example of an operation at the time of the cooling of the shaft part of the turbine of the cooling device after the internal combustion engine is started.
Figure 4:
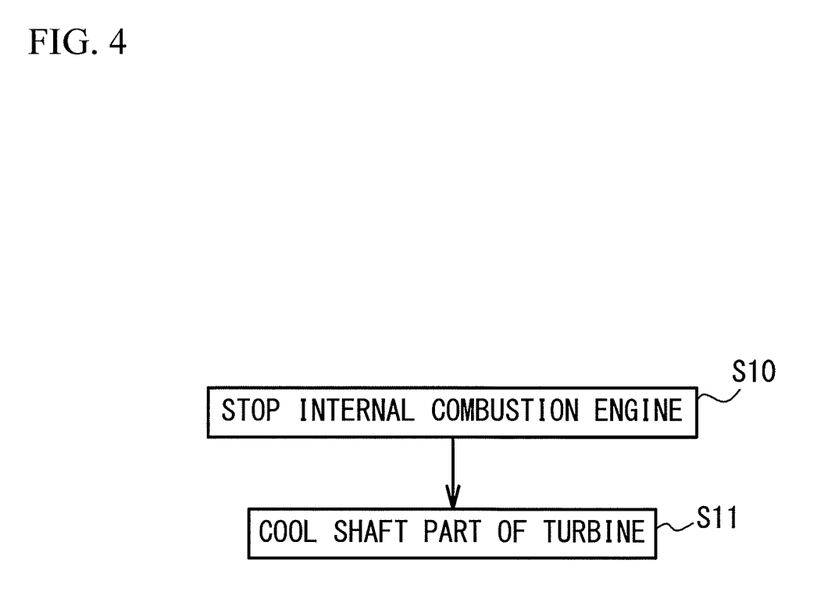
FIG. 4 is a flowchart illustrating an example of an operation at the time of the cooling of the shaft part of the turbine of the cooling device after the operation of the internal combustion engine is stopped.

The operation at the time of the cooling of the shaft part 62 of the turbine 60 of the cooling device 1 described above is generally explained by using a flowchart as described below. FIG. 3 is a flowchart illustrating an example of the operation at the time of the cooling of the shaft part 62 of the cooling device 1 after the internal combustion engine 11 is started. FIG. 4 is a flowchart illustrating an example of the operation at the time of the cooling of the shaft part 62 of the cooling device 1 after the operation of the internal combustion engine 11 is stopped. When the internal combustion engine 11 is started as illustrated in FIG. 3 (step S1) and a refrigerant temperature in the internal combustion engine 11 (specifically, a refrigerant temperature of the water jacket 15a or the water jacket 15b) is equal to or more than a predetermined value or a refrigerant temperature in the steam generator 40 is equal to or more than the predetermined value (YES in step S2), the turbine 60 receives the superheated steam discharged from the superheater 50 to operate (step S3). Here, the predetermined value of step S2 is a refrigerant temperature in which the turbine 60 can operate (rotate) when the refrigerant having a temperature equal to or more than the predetermined value is supplied from the internal combustion engine 11 or the steam generator 40 to the gas liquid separator 30 and then is supplied to the blade 63 of the turbine 60 through the superheater 50. An example of the predetermined value of step S2 is 80 degrees. On the other hand, when the step S2 is NO, the turbine 60 does not operate (step S4). The NO in step S2 corresponds to a case where the rankine cycle system 20 is during a warm-up, and the YES in step S2 corresponds to a case after the warm-up of the rankine cycle system 20 is stopped.

When the turbine 60 operates in step S3, the generator generates the electrical power. When the turbine 60 operates, the supply to the condenser 80 of the refrigerant discharged from the turbine 60 is also started. Then, the refrigerant changed to the liquid phase in the condensation part 82b of the condenser 80 is supplied to the shaft part 62 of the turbine 60 due to the gravity. Thereby, the shaft part 62 of the turbine 60 is cooled (step S5). The refrigerant after having cooled the shaft part 62 of the turbine 60 is supplied to the condenser 80 through the path 110k, and is mixed with the refrigerant supplied from the path 110f to the condenser 80 in the inlet tank 81. Then, a part of the refrigerant in the inlet tank 81 flows from the refrigerant supply part 84 into the condensation part 82b, next flows into the outlet tank 83b, and then is supplied again to the shaft part 62 of the turbine 60 through the path 110j. The processing of FIG. 3 described above is repeatedly performed while the internal combustion engine 11 is being operated.

Moreover, as illustrated in FIG. 4, even when the driving of the internal combustion engine 11 is stopped (step S10), the cooling device 1 cools the shaft part 62 of the turbine 60 (step S11). Specifically, the refrigerant in the condensation part 82b is supplied to the shaft part 62 due to the gravity even after the driving of the internal combustion engine 11 is stopped. As a result, the shaft part 62 can be cooled even after the driving of the internal combustion engine 11 is stopped. Then, while the shaft part 62 is a high temperature, the refrigerant changed to a gas phase by cooling the shaft part 62 is supplied again to the condensation part 82b through the path 110k. Therefore, while the shaft part 62 is the high temperature, the cooling of the shaft part 62 is continued even after the driving of the internal combustion engine 11 is stopped.

As described above, according to the cooling device 1 of the present embodiment, the rankine cycle system 20 of the cooling device 1 includes the path 110j (supply path) that supplies the liquid-phase refrigerant discharged from the condensation part 82b of the condenser 80 to the shaft part 62 of the turbine 60, and the refrigerant supply part 84 of the condensation part 82*b* of the condenser 80 is arranged higher than the shaft part 62 of the turbine 60 in the gravity direction. Therefore, the refrigerant changed to the liquid phase in the condensation part 82*b* of the condenser 80 can be supplied to the shaft part 62 of the turbine 60 through the path 110*j* due to the gravity. Thereby, the liquid-phase refrigerant discharged from the condensation part 82*b* of the condenser 80 need not be supplied to the shaft part 62 of the turbine 60 by the refrigerant pump, and hence an increase in cost can be suppressed. Thus, according to the cooling device 1, it is possible to suppress the increase in cost and cool the shaft part 62 of the turbine 60. As a result, it is possible to suppress the increase in cost and the damage of the bearings 65*a* and 65*b* of the turbine 60 due to heat.

Specifically, the cooling device 1 uses the bearings 65*a* and 65*b* in which the grease is sealed as bearings of the shaft part 62 of the turbine 60, as explained with FIG. 2. Here, if the shaft part 62 is not cooled by the refrigerant and the bearings 65*a* and 65*b* become the high temperature, seal mechanisms (seal mechanisms for sealing the grease) of the bearings 65*a* and 65*b* are more likely to be damaged by heat. In this case, the grease might leak out from the bearings 65*a* and 65*b*. In contrast, according to the cooling device 1, it is possible to suppress the increase in cost and cool the shaft part 62 as described above, and hence it is possible to suppress the increase in cost and the leakage of the grease from the bearings 65*a* and 65*b*. Moreover, according to the cooling device 1, the shaft part 62 is cooled even after the driving of the internal combustion engine 11 is stopped as explained with FIG. 4, and hence the leakage of the grease can be suppressed even after the driving of the internal combustion engine 11 is stopped.

Here, even if the cooling device 1 uses bearings other than the grease sealing bearings as the bearings of the shaft part 62, a damage in which the seal mechanisms for sealing a lubrication oil for bearing are transformed by heat may occur when the shaft part 62 is not cooled. Therefore, even when the bearings other than the grease sealing bearings are adapted as the bearings of the shaft part 62, the cooling device 1 according to the present embodiment can suppress the increase in cost and exhibit an effect of suppressing the damage of the shaft part of the turbine 60 due to heat. Moreover, according to the cooling device 1, it is possible to suppress the increase in cost and cool the shaft part 62 of the turbine 60, and hence it is possible to suppress the increase in cost and the damage of the seal parts 66*a* and 66*b* due to heat.

Here, if the liquid-phase refrigerant is only supplied to the shaft part 62 of the turbine 60, it is considered to supply the liquid-phase refrigerant in the water jackets 15*a* and 15*b* of the internal combustion engine 11 to the shaft part 62 of the turbine 60, for example. However, there is a high possibility that foreign matters are mixed into the refrigerant in the water jackets 15*a* and 15*b*. Therefore, when the refrigerant in the water jackets 15*a* and 15*b* is supplied to the shaft part 62 of the turbine 60, the seal parts 66*a* and 66*b* might be damaged due to the foreign matters mixed into the refrigerant. In contrast, as in the case of the present embodiment, the liquid-phase refrigerant discharged from the condensation part 82*b* is generated by condensing the gas-phase refrigerant, so that a possibility including the foreign matters is extremely low. Therefore, according to the cooling device 1, it is also possible to suppress the damage of the seal parts 66*a* and 66*b* due to the foreign matters mixed into the refrigerant.

Moreover, when the refrigerant in the water jackets 15*a* and 15*b* is supplied to the shaft part 62 of the turbine 60, it is considered to remove the foreign matters included in the refrigerant by a filter and supply the refrigerant after the removal of foreign matters to the shaft part 62. However, in this case, the cost may significantly increase by being provided with the filter. On the contrary, according to the cooling device 1 of the present embodiment, the increase in cost can be suppressed effectively in a point of also not requiring such a filter.

Here, as explained with FIG. 2, the cooling part 67 according to the present embodiment is arranged nearer to the blade 63 than the bearings 65*a* and 65*b* in the axial direction, but the arrangement location of the cooling part 67 is not limited to this as long as it is a place where the shaft part 62 can be cooled. To cite another example, the cooling part 67 may be arranged farther from the blade 63 than the bearings 65*a* and 65*b* in the axial direction or may be arranged between the bearings 65*a* and 65*b*. Here, as in the case of the present embodiment, the cooling part 67 is arranged nearer to the blade 63 than the bearings 65*a* and 65*b* in the axial direction, so that the heat of the blade 63 can be removed by the refrigerant in the cooling part 67 before being transmitted to the bearings 65*a* and 65*b* via the shaft part 62. Thereby, it is possible to effectively suppress the bearings 65*a* and 65*b* from becoming the high temperature.

Moreover, the cooling device 1 can have the following effects in comparison with a cooling device of comparative examples as explained below. First, a cooling device having an oil cooling device only to cool the shaft part 62 of the turbine 60 is assumed as a first comparative example, as substitute for cooling the shaft part 62 of the turbine 60 by the refrigerant in the internal combustion engine 11 as in the case of the present embodiment. The oil cooling device according to a first comparative example includes an oil pump that supplies an oil to the cooling part 67, an oil cooler that cools the oil, and an oil filter (the oil filter having fine meshes) that removes foreign matters from the oil. In the case of the oil cooling device according to the first comparative example, it is considered to be capable of cooling the shaft part 62 of the turbine 60. However, by including the oil cooling device, the configuration of the whole cooling device becomes complicated and the cost also increases considerably. In contrast, the cooling device 1 of the present embodiment can cool the shaft part 62 of the turbine 60 without the oil cooling device, and hence it is possible to suppress complexity of the configuration of the cooling device 1 and also suppress the increase in cost in comparison with the oil cooling device according to the first comparative example.

Moreover, assumed as a second comparative example is a cooling device in which a part of the path 110*h* of FIG. 1 in the downstream side from the pump 100 is branched and connected to the refrigerant supply part 68*b* of the turbine 60 and the refrigerant discharged from the catch tank 90 is supplied to the shaft part 62 of the turbine 60 by the pump 100. In the case of the cooling device according to the second comparative example, an internal pressure of the path 110*h* is high (this is because a high pressure of the water jacket 15*b* side of the internal combustion engine 11 is applied to the path 110*h*), and hence a pressure of the refrigerant supplied to the shaft part 62 of the turbine 60 via the path 110*h* also might be the high pressure. In this case, it might be difficult to perform the low pressure boiling on the refrigerant supplied to the shaft part 62. When the low pressure boiling of the refrigerant supplied to the shaft part 62 cannot be performed, the refrigerant cools the shaft part 62 by only the sensible heat, and hence it becomes difficult to cool the shaft part 62 effectively. Moreover, in the case of the second comparative example, if the refrigerant supplied to the shaft part 62 can boil, the refrigerant has a higher pressure than the refrigerant in the case of the cooling device 1 according to the present embodiment, and hence a boiling temperature of the refrigerant becomes higher than that of the present embodiment. Also in this respect, in the case of the second comparative example, it is difficult to cool the shaft part 62 effectively. In contrast, according to the cooling device 1 of the present embodiment, the low pressure boiling can be easily performed on the refrigerant supplied to the shaft part 62, and hence the refrigerant can effectively cool the shaft part 62 not only by the sensible heat but also by using the latent heat of the vaporization. Therefore, a cooling performance of the shaft part 62 of the cooling device 1 according to the present embodiment is higher than that of the second comparison example.

According to the cooling device 1 of the present embodiment, the shaft part 62 of the turbine 60 is pivotally supported by the bearings 65*a* and 65*b* into which the grease is sealed, and therefore it is possible to suppress the seizure of the bearings 65*a* and 65*b*. Moreover, the cooling device 1 of the present embodiment can have the following effects in comparison with a third comparative example as explained below.

Specifically, a cooling device that uses a lubrication oil of the internal combustion engine 11 as a lubrication oil for the bearings of the shaft part 62 of the turbine 60 is assumed as the cooling device according to a third comparative example. More specifically, the cooling device according to the third comparative example has a mechanism which supplies the lubrication oil of the internal combustion engine 11 to the bearings of the shaft part 62 of the turbine 60 by the oil pump. Also in the case of the third comparative example, the seizure of the bearings can be suppressed by the lubrication oil supplied to the bearings of the turbine 60. However, since the temperature of the lubrication oil of the internal combustion engine 11 is a high temperature, the lubrication oil needs to be cooled by an oil cooler and then supplied to the bearings to sufficiently exhibit the performance of the bearings. In this case, the cost of the cooling device might increase considerably. In contrast, the cooling device 1 according to the present embodiment can pivotally support the shaft part 62 of the turbine 60 without the oil cooler, and therefore the increase in cost of the cooling device 1 can be suppressed compared with the third comparative example. Moreover, in the case of the cooling device according to the third comparative example, thin foreign matters included in the lubrication oil of the internal combustion engine 11 might pass through the oil filter and flow into the bearings. In this case, the bearings might be damaged by the foreign matters. In contrast, according to the cooling device 1, the foreign matters might not be mixed into the bearings 65*a* and 65*b*, and hence the damage of the bearings 65*a* and 65*b* due to the foreign matters is also suppressed.

According to the cooling device 1 of the present embodiment, the condensation part 82*b* is arranged nearer to the part of the inlet tank 81 connected to the paths 110*f* and 110*k* than the condensation part 82*a*, as illustrated in FIG. 1, and hence the refrigerant supplied to the inlet tank 81 through the paths 110*f* and 110*k* can preferentially flow into the condensation part 82*b*. Thereby, the lack of an amount of the refrigerant flowing into the condensation part 82*b* can be suppressed. As a result, the lack of an amount of the refrigerant supplied from the condensation part 82*b* to the shaft part 62 of the turbine 60 can be suppressed.

While the exemplary embodiments of the present invention have been illustrated in detail, the present invention is not limited to the above-mentioned embodiments, and other embodiments, variations and variations may be made without departing from the scope of the present invention.

DESCRIPTION OF LETTERS OR NUMERALS

1 cooling device
10 ebullient cooling system
11 internal combustion engine
20 rankine cycle system
50 superheater
60 turbine
62 shaft part
65*a*, 65*b* bearing
80 condenser
84 refrigerant supply part
110*a*-110*k* path

The invention claimed is:

1. A cooling device for an internal combustion engine comprising:
   an ebullient cooling system in which a refrigerant cools the internal combustion engine by boiling in the internal combustion engine, and
   a Rankine cycle system including a superheater that superheats the refrigerant discharged from the internal combustion engine, a turbine to which the refrigerant discharged from the superheater is supplied, and a condenser that condenses the refrigerant discharged from the turbine;
   wherein the Rankine cycle system includes a supply path that supplies a liquid-phase refrigerant discharged from the condenser to a shaft part of the turbine, and
   a first supply part of the condenser to which the refrigerant discharged from the turbine is supplied is arranged higher than the shaft part of the turbine in a gravity direction, wherein
   the condenser includes a first condenser that condenses the refrigerant to be supplied to internal combustion engine, a second condenser that condenses the refrigerant to be supplied to the shaft part of the turbine, and an inlet tank that is common to the first condenser and the second condenser,
   the cooling device includes a first path that supplies the refrigerant after having been supplied to a blade of the turbine to the inlet tank, a second path that supplies to the inlet tank the refrigerant changed from a liquid phase to a gas phase in the shaft part of the blade, and
   the second condenser is arranged nearer to a part of the inlet tank connected to the first path and the second path than the first condenser.

2. The cooling device for the internal combustion engine as claimed in claim 1, wherein the turbine includes a blade to which the refrigerant discharged from the superheater is supplied, the shaft part coupled with the blade, and a bearing that pivotally supports the shaft part,
   the supply path supplies the liquid-phase refrigerant discharged from the condenser to the shaft part between the bearing and the blade, and
   the first supply part is arranged higher than the shaft part in the gravity direction.

3. The cooling device for the internal combustion engine as claimed in claim 2, wherein
   the supply path supplies the liquid-phase refrigerant discharged from the condenser to the shaft part between the shaft part and the blade without a refrigerant pump.

4. The cooling device for the internal combustion engine as claimed in claim 2, further comprising:
   a first seal part and a second seal part arranged between the blade and the bearing; and
   a second supply part that is surrounded by the first seal part, the second seal part and the shaft part, and to which the liquid-phase refrigerant is supplied.

5. The cooling device for the internal combustion engine as claimed in claim 1, wherein the shaft part of the turbine is pivotally supported by a bearing into which a grease is sealed.

\* \* \* \* \*